United States Patent Office 2,931,831
Patented Apr. 5, 1960

2,931,831

PROCESS AND PRODUCT OF REACTING BORIC ACID WITH ISOCYANATES

Robert S. Aries, New York, N.Y.

No Drawing. Application July 31, 1957
Serial No. 675,264

3 Claims. (Cl. 260—551)

This invention relates to novel compounds of boron which are triamino substituted derivatives of boron, and to a process for their manufacture. More particularly, this invention concerns a novel process of reacting boric acid with an organic monoisocyanate to form monomeric boron compounds of the type mentioned.

The new compounds of my invention possess a structure corresponding to the general formula

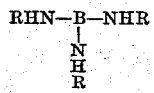

wherein R is an organic radical, such as an aryl, cycloalkyl, or an alkyl radical. They may be prepared by reacting boric acid with an organic isocyanate in accordance with the equation

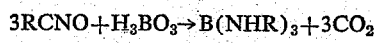

wherein R has the meaning referred to previously.

The foregoing reaction has been found to be a general one, in which the boric acid behaves as if it contains three hydroxyl groups with which the isocyanate groups react, liberating carbon dioxide, and forming the triamino boron derivative. There is no tendency for polymerization to take place, and the boron derivatives which are formed possess the characteristics of monomers.

The reaction may be carried out simply and directly, using the boric acid in finely powdered, dry condition. Preferably both reactants will be in the dry state, although under some circumstances, depending upon the kind of isocyanate employed, the use of a nonreactive solvent may be advantageous.

In accordance with stoichiometrical considerations, molar ratios of 1 boric acid to 3 of the isocyanate will generally be utilized, but it will be understood that variations may be made in this ratio without hindering the course of the reaction.

The reaction temperature is such that the reaction usually begins about 90° C., but, again depending upon the properties of the isocyanate, this temperature may be somewhat higher, extending to perhaps about 120° C.

The reaction takes place satisfactorily without a catalyst, but if desired a catalyst can be employed, in an amount of about 1% by weight of the reactants, such as, for example, a tertiary amine, such as triethylamine. The use of a catalyst enables the reaction to take place at a somewhat lower temperature, about 70° to 80° C. Carbon dioxide is liberated in the course of the reaction, which is complete when evolution of carbon dioxide ceases. Cessation of the reaction may be determined by passing a slow stream of an inert gas, such as nitrogen, into the reaction vessel and testing the effluent gas with lime water.

The new compounds obtained by the novel process of this invention are useful as additives for motor fuels and lubricants with which they may be blended by conventional methods. Used as gasoline blending agents in amounts ranging from 0.1 to 1.0 percent, they inhibit oxidation of unstable fuel components during storage, and preventing discoloration of the fuel. They also act as corrosion inhibitors in motor fuels. When incorporated into lubricating oils and greases in amounts ranging from about 0.2 to 0.5% they diminish tendencies toward sludge formation as well as exhibit antioxidant and anticorrosive properties.

The organic monoisocyanates which may be employed include aryl, cycloalkyl, and alkyl derivatives. As examples of such isocyanates which may be used to react with boric acid, mention is made of phenyl, naphthyl, toluyl, cyclohexyl, butyl, and amyl isocyanates.

In the following examples, the invention is illustrated with respect to boron trianilide and its preparation from boric acid and phenyl isocyanate, but it will be understood that the scope of the invention is not to be considered as limited thereby.

*Example 1*

12.37 g. of pure anhydrous boric acid (0.2 mole) and 71.4 g. of phenyl isocyanate (0.6 mole) are placed in a 500 ml. Pyrex flask. 1 g. of triethylamine catalyst was added under dry nitrogen atmosphere and the contents of the flask warmed slowly while passing in nitrogen. The reaction beings vigorously at about 80° C., with gas bubbles formed throughout the mass. The temperature is raised gradually to 110° C. Heating is discontinued when the reaction is indicated as complete by an absence of precipitation when passing some of the gas through lime water. The product is recovered as a white powder, soluble in organic solvents, and having a composition corresponding to that of boron trianilide $(C_6H_5HN)_3B$.

It will be understood that departures and modifications may be made in the scope of the invention as defined in the appended claims.

I claim:

1. A process of preparing triamino trisubstituted derivatives of boron which comprises heating 1 mole of boric acid with 3 moles of an organic monoisocyanate of the formula RCNO, wherein R is selected from the group consisting of aryl, cyloalkyl, butyl, and amyl, at a temperature between 90° and 120° C. in the presence of a tertiary amine catalyst.

2. A process of preparing an aryl substituted triamino derivative of boron which comprises heating boric acid with an aryl monoisocyanate in the presence of triethylamine as a catalyst at a temperature between 70° and 120° C.

3. A process of preparing boron trianilide which comprises heating 1 mole of boric acid with 3 moles of phenyl isocyanate in the presence of triethylamine as a catalyst at a temperature between 80° and 110° C.

References Cited in the file of this patent

UNITED STATES PATENTS

| | | |
|---|---|---|
| 2,517,944 | Upson | Aug. 8, 1950 |
| 2,655,524 | Sowa | Oct. 13, 1953 |
| 2,864,780 | Katz et al. | Dec. 16, 1958 |

OTHER REFERENCES

Goubeau: Zeitschrift für Anorganische und Allgemeine Chemie, vol. 275, pp. 161–175 (1954).

Skinner: Journal of the Chemical Society (1953), pp. 4025–8.

Kinney: Journal of Organic Chemistry, vol 8, pp. 526–531 (1943).

Kinney: Journal of the American Chemical Society, vol. 64, pp. 1378–81 (1939).

Ridial: Deutsche Chemische Gesellschaft (Berichte), vol. 22, pp. 992–3 (1889).